Dec. 8, 1970 C. J. DEL RIESGO 3,546,600

SIGNAL FREQUENCY DETECTOR CIRCUIT

Filed Jan. 3, 1968 2 Sheets-Sheet 1

INVENTOR
C. J. DEL RIESGO
BY E J Ohnider
ATTORNEY

Dec. 8, 1970 C. J. DEL RIESGO 3,546,600

SIGNAL FREQUENCY DETECTOR CIRCUIT

Filed Jan. 3, 1968 2 Sheets-Sheet 2

United States Patent Office 3,546,600
Patented Dec. 8, 1970

3,546,600

SIGNAL FREQUENCY DETECTOR CIRCUIT

Charles J. Del Riesgo, Plainfield, N.J., assignor to Bell Telephone Laboratories, Incorporated, Murray Hill and Berkeley Heights, N.J., a corporation of New York Filed Jan. 3, 1968, Ser. No. 695,447
Int. Cl. H03k 5/20
U.S. Cl. 328—109 6 Claims

ABSTRACT OF THE DISCLOSURE

Frequency selectivity in a low frequency pulse detecting circuit is attained by establishing an acceptance window on the incoming pulse period by the employment of a monopulser circuit to guard against pulse rates higher than desired in combination with a responsive delay timer to guard against pulse rates lower than desired.

BACKGROUND OF THE INVENTION

Field of the invention

This invention relates to frequency detector circuits and more particularly to circuits that are operatively responsive to pulse input signals having pulse rates that fall within preselected limits.

Description of the prior art

Accepting or rejecting an electrical input signal on the basis of frequency is a commonplace technique. One conventional method, for example, involves the use of passive filter circuits. With the proper arrangement of circuit elements into a filter network, precise filter functions such as bandpass and band elimination may readily be achieved. At very low frequencies, however, toward the lower end of the audio range for example, conventional passive filter circuits are ineffective and active filters must generally be employed to measure the time between successive peaks or pulses of the incoming signal. Known arrangements of this type are far from ideal in that the establishment of fixed limits of frequency acceptance or rejection has heretofore required circuitry which is unduly complex and therefore not fully reliable. Additionally, known filters of this type provide no simple means of eliminating higher harmonics and multiples thereof.

Accordingly, a general object of the invention is to improve detection circuits for low frequency pulses. Another object is to simplify such circuits and to enhance the discrimination of such circuits particularly in signal environments that include strong higher order harmonics.

SUMMARY OF THE INVENTION

The stated objects and other objects are achieved in accordance with the principles of the invention by a circuit combination that, in effect, establishes an accurately fixed acceptance window on the period of incoming signals. The window is created primarily by the tandem combination of a monopulser circuit and a delay timer circuit. The arrangement is accordingly aptly termed a digital filter. Inputs to the monopulser are first differentiated and then integrated to some degree in order to avoid the possibility of passing noise or unwanted high frequency signals. In accordance with the invention the monopulser is set at a rate which corresponds to the highest desired incoming pulse frequency, and the components of the delay timer are selected to establish a timing interval that corresponds to the lowest desired incoming pulse rate. One feature of the invention relates to a means for discriminating against multiple harmonics of the incoming signal. In accordance with the invention, the discriminating function is performed by a harmonic discriminator circuit together with logic circuitry that operates uniquely to control the operation of the monopulser circuit.

GENERAL DESCRIPTION OF BLOCK DIAGRAM

Figure 1:
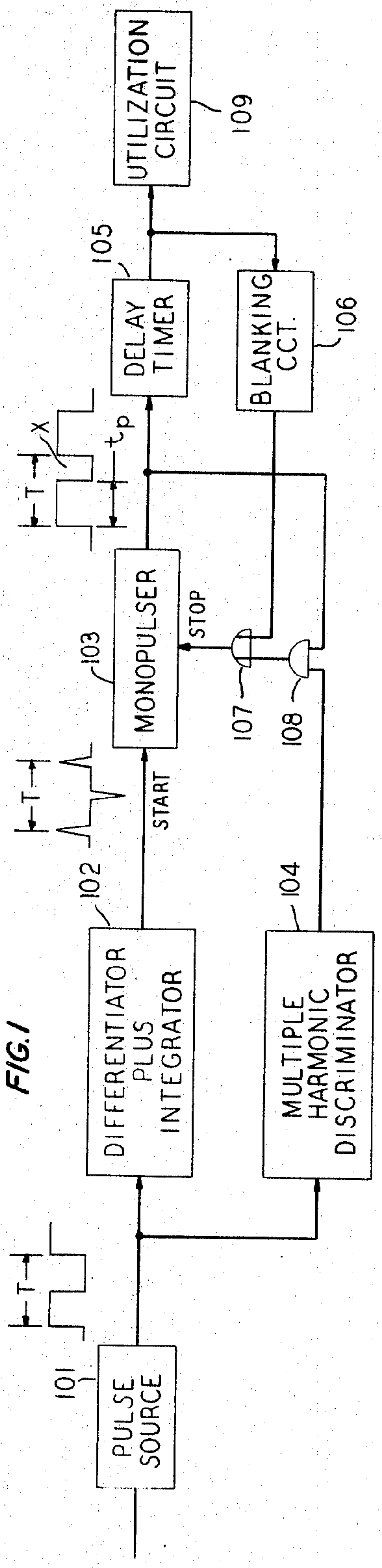
FIG. 1 is a block diagram of a digital filter circuit in accordance with the invention.

As a preface to a discussion of the block diagram of a circuit in accordance with the invention as shown in FIG. 1, it may be helpful to point out one specific illustrative use or environment for such a circuit. As indicated above, the general function of a circuit in accordance with the invention is to detect the presence of a pulse train input and to provide some indication of acceptance or registration in the event that the pulse repetition rate of the incoming signal falls within a preselected band. The width of the selective band may readily be varied by the selection of appropriate values for the timing elements in the circuit and, accordingly, the circuit may properly be considered as a variable bandwidth digital filter. Such a circuit is obviously potentially useful as an important building block in any one of a number of pulse systems. In a telephone signaling system, for example, it is essential to provide the indicated function as an interface between local D.C. signaling and the A.C. signals required for transmission over a carrier facility. Telephone ringing signals, for example, may at some point in a telephone signaling system be indicated by a train of unipolar or D.C. pulses. For transmission by carrier, such signals are typically converted into a series of tone bursts. Terminal equipment at the receiving end of the system is then employed to convert the tone bursts into a pulse train at the standard ringing frequency of 20 Hz. Such conventional terminal equipment is represented by the pulse source 101 shown in FIG. 1. For reasons not pertinent to the disclosure of the instant invention, it is desirable in a telephone signaling system of this type to provide a simple "on" or "off" output to indicate whether the rate of the incoming pulses falls within preselected limits. An output which indicates acceptance is then applied to a conventional regeneration circuit so that accurate ringing signals may be generated anew. The utilization circuit 109 of FIG. 1 is intended to be representative of such regenerating circuitry.

The detector proper which interconnects the pulse source 101 and the utilization circuit 109 includes a differentiator plus integrator circuit 102, a monopulser circuit 103 and a delay timer circuit 105, all connected in series relation. In order to guard against the spurious operation of the detector by unwanted signals that are multiple harmonics of the desired pulse rate, a multiple harmonic discriminator circuit 104 is connected between the output point of the pulse source 101 and the monopulser circuit 103. Logic circuitry including an AND gate 108 and an OR gate 107 completes the connection from the discriminator 104 to the monopulser circuit 103.

A blanking circuit 106 is connected from the output of the delay timer 105 to the input of the OR gate 107 which provides a blanking of the detector on certain erroneous signals in order to establish a recycling margin for the circuits which may follow the detector. The specific design of this latter circuit is primarily a consequence of the circuits, particularly timing circuits, which may follow the detector rather than being an integral part of the detection technique.

OPERATION IN TERMS OF THE BLOCK DIAGRAM

The pulse signals generated by the pulse source 101 are first differentiated and then partially integrated by the differentiator-integrator 102 in order to afford some protection to the system against high frequency signals such as speech, battery noise and the like. The output of the integrator 102, a train of bipolar spike pulses as shown, is applied as an input to the monopulser 103. The output of the monopulser takes the form of the pulse train shown with a period of duration T, a pulse length of duration $t_p$ and a pulse separation time of duration $x(T-t_p)$. The delay timer 105 follows the monopulser 103 but delays its turn-on time for a preset timed interval after the pulser 103 goes off. The delay timer normally registers a steady voltage level output which disappears only in the presence of a pulse train input having a repetition rate within prescribed limits.

The selectivity of the system in its operation as a variable bandwidth digital filter can best be explained in terms of a simple specific example. Assume first that the detection of a pulse signal having a repetition rate from 10 to 12.5 pulses per second (100 to 80 milliseconds) is desired. The monopulser 103 is employed in accordance with the invention to provide a check on the highest allowable pulse repetition rate or frequency and accordingly would be set for a $t_p$ duration of $80^-$ milliseconds. The delay timer 105 is utilized in accordance with the invention to mark the lowest allowable frequency and accordingly would be set for a delay time of $20^+$ milliseconds ($100-80^-=20^+$).

Consider now the operation of the circuit in response to an input signal of 10 p.p.s., the lowest allowable frequency. As the first pulse is applied to the detector, it triggers the monopulser 103 which turns on, simultaneously turning the delay timer 105 off. The delay timer 105 stays off as long as the monopulser 103 is on and then times on after the elapse of its inherent $20^+$ millisecond delay. At the end of the $80^-$ millisecond period, the monopulser 103 turns off and the delay timer 105 begins to time. Just as the timer 105 is about to turn on, however (to indicate non-acceptance of the input signal rate) the second input pulse arrives and resets the monopulser 103. As a consequence, the delay timer 105 remains off. In this example it should be noted again that an "off" condition of the delay timer 105 is employed to indicate the presence of an input signal having an acceptable frequency. Depending upon the specific circuitry employed, however, it is evident that an "on" condition for the delay timer might alternatively be used for the purpose indicated.

It is clear from the above example that if the speed or rate of the input signal were lower (or higher) than the limits of the preselected range, then the timer would have shifted into the "on" condition, indicating an unacceptable signal. Consider now the action of the circuit in response to an input signal of 12.5 p.p.s. In this case the monopulser 103 turns on and immediately after it goes off, the input resets it. The delay timer is thus held off. If a pulse frequency exceeding 12.5 p.p.s. is encountered, the second transition occurs during the time that the monopulser is on and accordingly is ignored. As a result, the system goes out of synchronism and the delay timer turns on to indicate an unacceptable signal rate.

The described loss of synchronism is not brought about, however, by multiple harmonics of the accepted range which in the case of a basic acceptable rate of 10 to 12.5 p.p.s. would be 20 to 25 for the second harmonic and 30 to 37.5 for the third harmonic. In accordance with the invention a multiple harmonic discriminator 104, in combination with a steering AND gate 108 and a connecting OR gate 107, is incorporated to prevent synchronization by multiple harmonics. The differentiated input signal is applied to a stop lead on the monopulser 103 by way of the path indicated only if the monopulser is on. Since the monopulser 103 is set to the highest acceptable rate, it cannot be on when the input switches unless the input rate is greater than the monopulser delay period.

If a detector in accordance with the invention is employed as a ringing detector in a telephone signaling system in the manner indicated above, a typical acceptance frequency range would be $20\pm3$ Hz. The principles of the invention, however, are in no way restricted to any particular frequency or frequency range.

SPECIFIC CIRCUIT STRUCTURE

Figure 2:
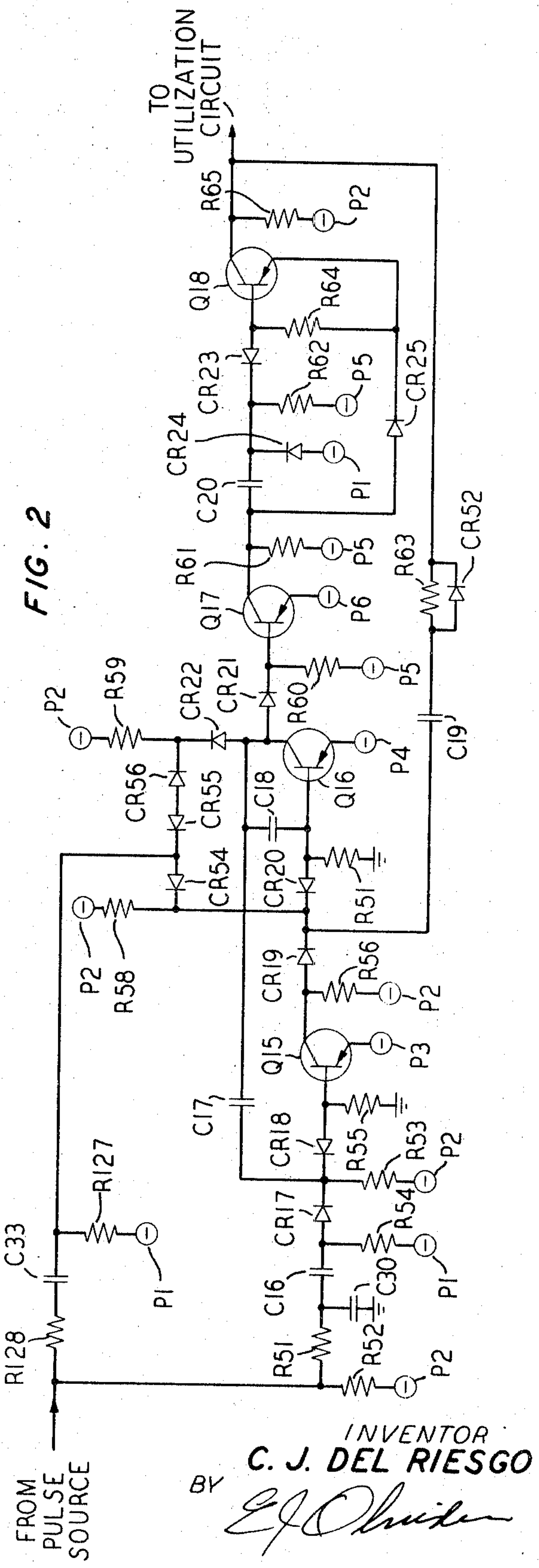
FIG. 2 is a schemtaic circuit diagram of the arrangement shown in FIG. 1.

An illustrative detailed schematic circuit diagram of the circuit shown in block form in FIG. 1 is shown in FIG. 2 omitting, however, any specific showing of the pulse source 101 or the utilization circuit 109. The differentiator-integrator circuit 102 includes resistors R51, R52, and R54 together with the capacitors C16 and C30. The key components of the monopulser circuit 103 are the transistor Q15, transistor Q16, resistor R53 and capacitor C17. The delay timer 105 is comprised of the transistor Q17, the transistor Q18, the resistor R62 and the capacitor C20. The blanking circuit 106 includes the diode CR52, the resistor R63 and the capacitor C19. Resistors R127 and R128, diodes CR54, CR55, and CR56, and capacitor C33 make up the multiple harmonic discriminator 104.

Other individual circuit components shown in FIG. 2 not indicated specifically as integral parts of the subcircuits shown in block form in FIG. 1 serve the following functions: Diode CR17 provides isolation from the input pulse source 101. Overload protection for the adjacent transistors is provided by the diodes CR18, CR19, CR20, and CR23. A circuit path for dissipation of the $I_{co}$ current of each of the transistors is provided by the resistors R55, R51, R60 and R64. Transistor biasing levels are established by resistors R56 and R65, and diode CR25 blocks current flow between the power sources P2 and P5. A recycling path for the delay timer is established by the diode CR24 and by the resistor R61. For one particular set of circuit element magnitudes the power supply levels employed were as follows:

P1=−5.6 v.
P2=−24 v.
P3=−.7 v.
P4=−1.4 v.
P5=−48 v.
P6=−2.8 v.

DETAILED CIRCUIT OPERATION

Each of the individual subcircuits shown in block form in FIG. 1, of and in itself, is substantially conventional both in function and, as shown in FIG. 2, in structure. Accordingly, a detailed description of the operation of the circuit shown in FIG. 2 may be presented most advantageously in terms of the cooperative interrelationship of the subcircuits with reference also to the related waveforms shown in FIGS. 3 and 4.

By way of example consider an input signal of period $t_{in}$, a monopulser period if $t_p$ and an output timer delay of $t_{op}$. When the first input pulse, shown in waveform A of FIG. 3, enters the system at time $t=0^+$ the signal is differentiated and integrated as shown by the waveform B, FIG. 3. The monopulser, transistors Q15 and Q16, then operates for a period $t_p$ which raises the voltage level on the collector of transistors Q16 as shown by waveform D. The operating characteristics of the monopulser are such that a slight delay $t_e$ occurs between the drop in the collector voltage of transistor Q15 and the time of the abrupt increase in the collector voltage of transistor Q16. This delay is provided in order to avoid false triggering in response to battery supply transients or other brief spurious signals.

Figure 3:
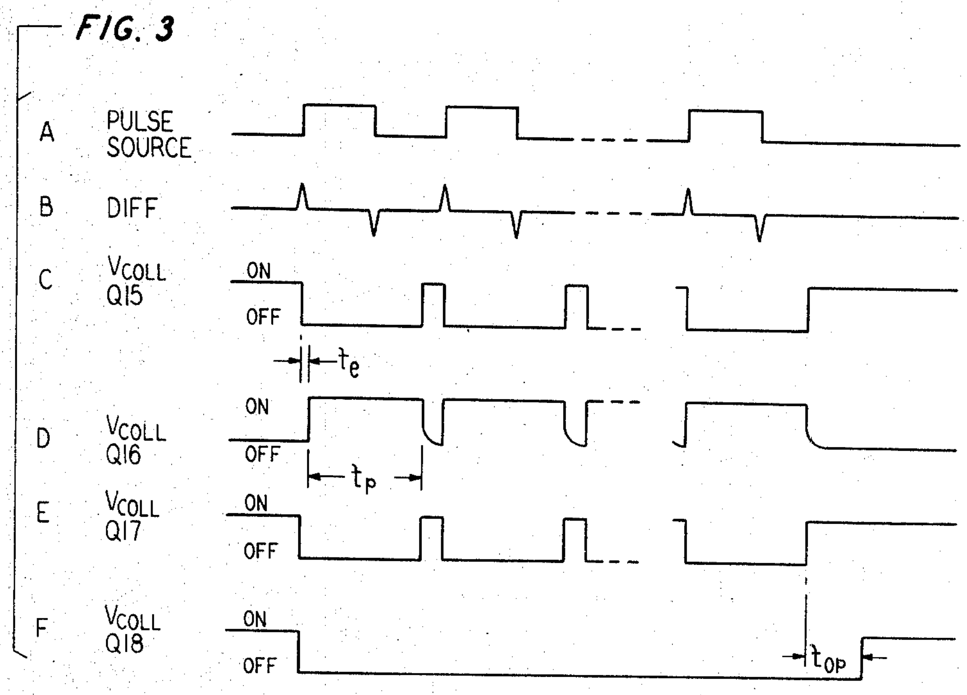
FIG. 3 is a family of waveforms illustrating the operation of the circuit in FIG. 2 with the pulse rate of the incoming signal within preselected limits.
Figure 4:
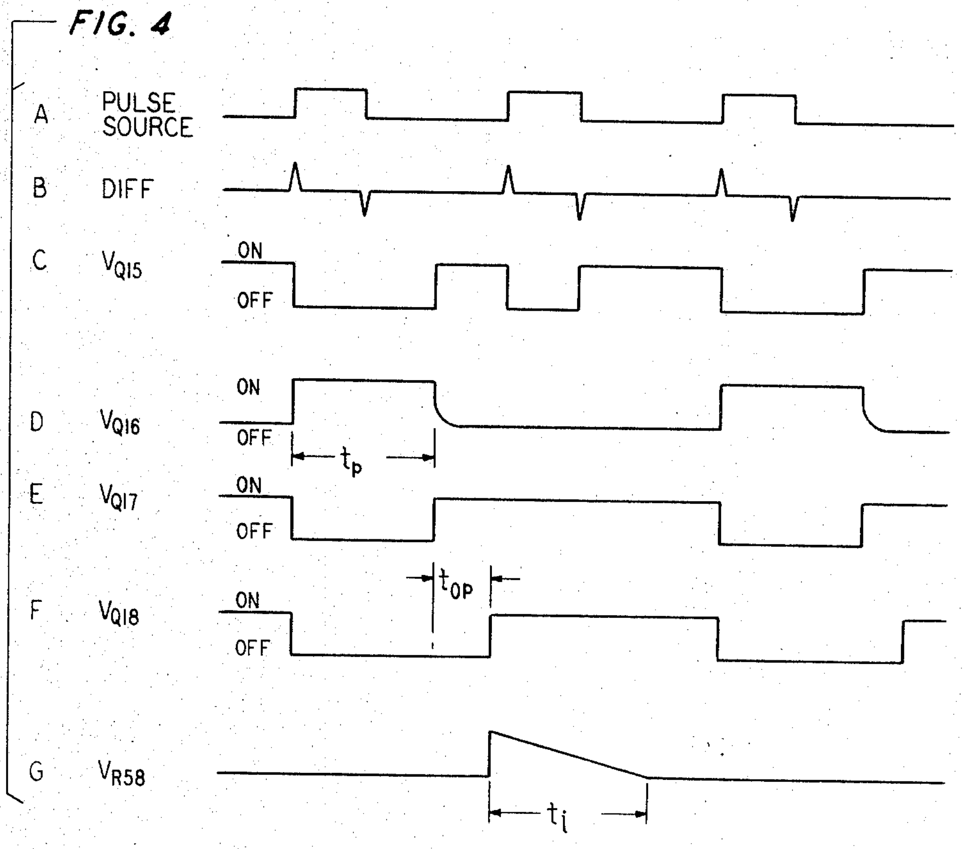
FIG. 4 is a family of waveforms illustrating the operation of the circuit in FIG. 2 with the pulse rate of the incoming signal below preselected limits.

When the delay timer 105 is turned off by the output of the monopulser the voltage on the collector of transistor Q18 drops to the "off" level. The delay timer 105, as represented by the state of the collector voltage of transistor Q18, remains off for the interval $t_p$ plus an additional period corresponding to its own operate delay interval $t_{op}$. If $t_{in}$ is between $t_p$ and $t_p$ plus $t_{op}$, as shown by the waveforms in FIG. 3, the delay timer, transistor Q18, remains off over the complete train of input signals. If, however, $t_{in}$ is greater than $t_p$ plus $t_{op}$, as shown by the waveforms of FIG. 4, then the operate timer as represented by the collector output of transistor Q18 of FIG. 4 will turn on, which in a telephone signaling system environment of the type indicated above causes the ringing delay circuits, not shown, to recycle.

In order to ensure an adequate recharging cycle for such delay circuits, the blanking circuit (CR52, R63, and C19) is provided so that if an interruption does occur (delay timer turns on), the timer will remain on for at least a preselected minimum period. During the idle condition transistors Q17 and Q18 are both on and capacitor C19 of the blanking circuit is discharged. When the monopulser (Q15 and Q16) and the timer (Q17 and Q18) switch in response to an input pulse as described above, capacitor C19 charges toward the level of the power supply P2 through the base of transistor Q16 and the collector resistor R65 of transistor Q18. Once capacitor C19 is charged, the turn on of transistor Q18 causes the diode CR20 to be back biased, thus holding transistor Q16 off and transistors Q17 and Q18 on. The time period $t_l$ associated with the blanking circuitry may be illustrated in terms of the voltage change across resistor R58 as shown in waveform G of FIG. 4. The purpose of resistor R63 is to prevent capacitor C19 from delaying the turn on of transistor Q16 when transistor Q18 is on, and diode CR52 is provided to decrease the recycling time of capacitor C19.

As indicated above, the possibility of operating the detector in response to multiple harmonics of the detection frequency is minimized in accordance wih the invention by the employment of the multiple harmonic discriminator circuit 104 which includes capacitor C33, resistors R127 and R128 and diodes CR54, CR55, and CR56, together with connecting logic circuitry. Simply stated, the purpose of the discriminator is to stop the monopulser if it should receive a pulse during its timing interval. For this situation to occur, the input pulse rate must exceed the fixed rate of the monopulser (e.g., 23 p.p.s.). Although this feature of the invention enhances the immunity of the detector to speech operation, the potential advantage of this effect cannot be fully exploited in a telephone signaling system since the system must be capable of ringing detection in the presence of carrier inpulse noise. In effect, a primary function of resistor R128 is to effect a compromise between improved protection against operation by speech signals and protection against operation by impulse noise.

In further detail, the harmonic discriminator feature of the invention operates in the following manner: With no pulse input, transistor Q15 is on and transistor Q16 is off. Capacitor C33 is initially charged toward the level of power supply P2 through resistor R52, resistor R128, diode CR55, diode CR56 and resistor R59. When an input pulse signal is applied to the detector, transistor Q15 is turned off by the positive differentiated signal from capacitor C16, as shown in FIG. 3. The positive transition of the pulse is also coupled through resistor R128 and capacitor C33 to transistor Q16. However, as transistor Q16 is off, capacitor C33 discharges through resistors R58 and R59. As indicated above, after a brief delay $t_e$ which may be on the order of 200 microseconds, an illustrative $t_e$ being shown in FIG. 3, transistor Q16 turns on back biasing the diode CR56. At the conclusion of the timing cycle $t_p$, transistor Q16 turns off, as shown by waveform D of FIG. 3, and capacitor C33 recharges through resistor R28, diodes CR55 and CR56 and resistor R59.

In the event that a second input pulse occurs during the timing interval $t_p$ when transistor Q16 is on, the diode CR56 is back biased and the positive transition is transferred directly to the base of transistor Q16 which serves to place a reverse bias on the diode CR19. This action causes transistor Q16 to turn off and transistor Q15 to turn on, thus interrupting the normal sequence and providing circuit insensitivity to high input frequencies. As previously indicated, the full potential of this technique cannot be utilized in the environment of a telephone signaling circuit inasmuch as a ringing signal in the presence of impulse noise will produce conditions similar to high frequency inputs.

It is to be understood that the embodiment described herein is merely illustrative of the principles of the invention. Various modifications thereto may be effected by persons skilled in the art without departing from the spirit and scope of the invention.

What is claimed is:

1. A detector circuit for detecting pulse signals within a preselected range of pulse repetition rates by establishing an acceptance window comprising, in combination, a monopulser circuit operatively responsive to a pulse input for registering a first time period of preselected duration, a time delay circuit operatively responsive to an output from said monopulser circuit extending for the duration of said first time period plus a second time period of preselected duration, said delay circuit generating a nonacceptance signal at the termination of said second period in the event that the pulse frequency of said input is below said preselected range, said delay circuit generating a non-acceptance signal in the event that the pulse frequency of said input exceeds said preselected range, and discriminator means responsive to multiple harmonics of said pulse signals for rendering said monopulser circuit inoperative.

2. Apparatus in accordance with claim 1 wherein said discriminator means includes an AND gate circuit having two input points and a single output point, means including a resistive circuit device and a capacitive circuit device in series relation connecting the source of said pulse signals to one of said two input points, first means connecting the output of said monopulser to the other of said two input points, and second means connecting the output point of said AND gate to said monopulser thereby to provide a path for a signal inhibiting the operation of said monopulser.

3. Apparatus in accordance with claim 2 wherein said second connecting means includes an OR gate, means including a blanking circuit connecting the output of said time delay circuit to one input of said OR gate whereby either an output from said blanking circuit or an output from said AND gate may be utilized to inhibit the operation of said monopulser.

4. A variable bandwidth digital filter circuit comprising, in combination, a monopulser circuit set to establish a limit on the maximum allowable pulse repetition rate of received signals, means including a delay timing circuit operatively responsive to an output from said monopulser circuit and set to establish a limit on the minimum allowable pulse repetition rate of received signals, said means producing a continuous output signal at a preselected voltage level only in the event that the signal input to said monopulser circuit has a pulse repetition rate between said maximum and minimum rates, said filter circuit further including discriminator means having a common input point with said monopulser circuit, said discriminator means being responsive to input signals applied to said input point at multiple harmonic rates of signals between said maximum and minimum rates in order to disable said monopulser, thereby precluding the registration of said continuous output signal in response to multiple harmonics of acceptable input signals.

5. Apparatus in accordance with claim 4 wherein said discriminator means includes an AND gate circuit having two input points and a single output point, means including a resistive circuit device and a capacitive output device in series relation connecting the source of said pulse signals to one of said two input points, first means connecting the output of said monopulser to the other of said two input points, and second means connecting the output point of said AND gate to said monopulser thereby to provide a path for a signal inhibiting the operation of said monopulser.

6. Apparatus is accordance with claim 5 wherein said second connecting means includes an OR gate, means including a blanking circuit connecting the output of said time delay circuit to one input of said OR gate, whereby either an output from said blanking circuit or an output from said AND gate may be utilized to inhibit the operation of said monopulser.

References Cited

UNITED STATES PATENTS

| | | | |
|---|---|---|---|
| 2,541,038 | 2/1951 | Cleeton | 328—109 |
| 2,857,587 | 10/1958 | Tollefson et al. | 340—167XR |
| 3,028,556 | 4/1962 | Du Vall | 328—140XR |
| 3,184,606 | 5/1965 | Ovenden et al. | 307—233 |
| 3,299,404 | 1/1967 | Yamarone et al. | 307—233XR |
| 3,305,732 | 2/1967 | Grossman et al. | 328—138XR |

STANLEY T. KRAWCZEWICZ, Primary Examiner

U.S. Cl. X.R.

307—233; 328—138, 140; 340—167